(12) United States Patent
Yi et al.

(10) Patent No.: US 9,389,715 B2
(45) Date of Patent: Jul. 12, 2016

(54) DISPLAY APPARATUS FOR SENSING MULTI-TOUCH AND PROXIMITY OBJECT

(75) Inventors: Kwon Ju Yi, Yongin-si (KR); Chang Kyu Choi, Seongnam-si (KR); Sung Joo Suh, Seoul (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 13/287,435

(22) Filed: Nov. 2, 2011

(65) Prior Publication Data

US 2012/0146953 A1 Jun. 14, 2012

(30) Foreign Application Priority Data

Dec. 13, 2010 (KR) ........................ 10-2010-0126898

(51) Int. Cl.
*G06F 3/041* (2006.01)
*G06F 3/042* (2006.01)
(52) U.S. Cl.
CPC .............. *G06F 3/0412* (2013.01); *G06F 3/042* (2013.01); *G06F 2203/04103* (2013.01)
(58) Field of Classification Search
CPC .................. G06F 3/0412; G06F 3/042; G06F 2203/04103
USPC ................................................ 345/173, 175
See application file for complete search history.

(56) References Cited

U.S. PATENT DOCUMENTS

| 5,923,308 A * | 7/1999 | Wei et al. .......................... 345/44 |
| 2007/0120834 A1* | 5/2007 | Boillot ........................... 345/173 |
| 2008/0106628 A1* | 5/2008 | Cok et al. ................... 348/333.01 |
| 2008/0174530 A1* | 7/2008 | Booth et al. ...................... 345/82 |
| 2010/0001978 A1* | 1/2010 | Lynch et al. .................... 345/175 |
| 2010/0220077 A1* | 9/2010 | Fukunaga et al. ............. 345/175 |
| 2011/0109592 A1* | 5/2011 | Kurokawa et al. ............. 345/175 |
| 2012/0146953 A1* | 6/2012 | Yi et al. ......................... 345/175 |

FOREIGN PATENT DOCUMENTS

| CN | 101153972 A | 4/2008 |
| CN | 101533170 A | 9/2009 |
| CN | 201549183 U | 8/2010 |
| JP | 2004-303731 | 10/2004 |
| JP | 2008-305154 | 12/2008 |
| JP | 2010-49479 A | 3/2010 |
| JP | 2010-152072 A | 7/2010 |
| KR | 10-2009-0065182 A | 6/2009 |
| KR | 10-0916321 | 9/2009 |
| KR | 10-2010-0008707 | 1/2010 |

OTHER PUBLICATIONS

Chinese Office Action issued on Oct. 8, 2014 in counterpart Chinese Application No. 201110421260.2 (20 pages, with English translation).
Korean Office Action issued on Apr. 8, 2016, in counterpart Korean Application No. 10-2010-0126898 (7 pages in English, 6 pages in Korean).
Chinese Decision of Rejection issued on Apr. 12, 2016, in counterpart Chinese Application No. 201110421260.2 (12 pages in English, 6 pages in Chinese).

* cited by examiner

*Primary Examiner* — Jonathan Boyd
(74) *Attorney, Agent, or Firm* — NSIP Law (57) ABSTRACT

A display apparatus that may enable sensing a multi-touch and a proximity object is provided. The display apparatus may display an image generated by the object on an organic light emitting diode (OLED) display panel, and may sense an invisible light that may be reflected by the object and may have entered through a hole.

28 Claims, 7 Drawing Sheets

→ Reflected light by object

⇨ Directly emitted light

→ Reflected light by object

⇨ Directly emitted light

FIG. 7

→ Reflected light by object

⇨ Directly emitted light

DISPLAY APPARATUS FOR SENSING MULTI-TOUCH AND PROXIMITY OBJECT

CROSS-REFERENCE TO RELATED APPLICATIONS

This application claims the priority benefit of Korean Patent Application No. 10-2010-0126898, filed on Dec. 13, 2010, in the Korean Intellectual Property Office, the disclosure of which is incorporated herein by reference.

BACKGROUND

1. Field

One or more example embodiments of the present disclosure relate to an apparatus that may sense an image touched by an object or a target image, and may display an information image corresponding to the sensed touch image or the sensed target image as an input signal.

2. Description of the Related Art

According to developments in display technology, an interest has increased in technology to identify a position of an object that may touch a display. A conventional display apparatus may provide an interaction with a user in response to a touch object or a proximity object by applying a sensing apparatus to an in-cell of a liquid crystal display (LCD) panel or an on-cell of the LCD panel.

Particularly, an organic light emitting diode (OLED) display panel may have high optical efficiency, an optimal viewing angle, and a reaction speed better than an LCD display panel. Generally, a photo sensor corresponding to a device that may react to a visible light or an infrared light, for example, crystallized silicon, or amorphous silicon, may be used to form a photoconductive layer. Here, when a visible light is used as a light source for sensing a touch object or a proximity object, an OLED illumination unit, that may be used as a display or for illumination, may be difficult to use as the light source for sensing the object since a light of the OLED illumination unit may need to be constantly maintained. Thus, an invisible light may need to be used as the light for sensing the touch object or the proximity object.

Also, the crystallized silicon and the amorphous silicon may not usually be used to integrate a photoconductive device on the OLED panel, during an OLED manufacturing process, and accordingly there would be difficulty in forming the photoconductive layer during the OLED manufacturing process. In addition, materials to be used to form the photoconductive layer may be responsive to the visible light, and accordingly the photoconductive layer and an invisible light pass filter may be difficult to be minutely integrated in a narrow area of the OLED panel in order to sense the invisible light.

Accordingly, a display technology that may result in less change of a configuration of an OLED illumination apparatus or a configuration of a display panel, and that may sense a touch object or a proximity object for interaction while maintaining intrinsic quality of the apparatus, such as an illumination, or image quality is desired.

SUMMARY

The foregoing and/or other aspects are achieved by providing a display apparatus, including an organic light emitting diode (OLED) illumination unit including at least one OLED, the OLED illumination unit to transmit an invisible light, and a sensor panel disposed on a lower part of the OLED illumination unit, the sensor panel to sense at least one of the invisible light and a shadow.

The display apparatus may further include a hole, disposed in the OLED illumination unit, to transmit a light.

The display apparatus may further include a light interception unit disposed on a border between the OLED illumination unit and the hole so that the sensor panel may sense a light vertically entering through the hole.

Here, the OLED illumination unit may include at least one OLED to emit a visible light of a same color, and may be configured in a form of a planar panel. The hole may be disposed between OLEDs to emit the visible light of the same color.

The OLED illumination unit may correspond to an OLED display panel including at least one OLED to emit a visible light of various colors. The hole may be disposed between OLEDs to emit the light of the various colors.

The display apparatus may further include a backlight unit disposed on a lower part of the sensor panel, the backlight unit to emit invisible light used for sensing an object that touches the OLED illumination unit, or an object that is proximate to the OLED illumination unit.

Here, when the backlight unit is disposed on the lower part of the sensor panel, the hole may be formed in both the OLED illumination unit and the sensor panel.

The OLED illumination unit may have a configuration including an invisible light source to emit invisible light used for sensing an object.

The display apparatus may further include a front light unit, disposed on an upper part of the OLED illumination unit, to emit invisible light used for sensing an object.

The display apparatus may further include an invisible light source, disposed outside of the OLED illumination unit, to emit invisible light used for sensing an object.

Also, the sensor panel may include an invisible light pass filter to pass the invisible light and the shadow, by filtering lights received through the OLED illumination unit, and a photoconductive layer to sense the invisible light and the shadow passed by the filtering, through the hole.

The foregoing and/or other aspects are achieved by providing a display apparatus, including an OLED illumination unit including at least one OLED, the OLED illumination unit to transmit an invisible light having a long wavelength, and a sensor panel disposed on a lower part of the OLED illumination unit, the sensor panel to sense at least one of the invisible light having the long wavelength, and a shadow.

Here, the OLED illumination unit may include at least one OLED to emit a visible light of a same color, and may be configured in a form of a planar panel. When a device to emit the visible light of the same color is designed to be sufficiently thin to transmit an infrared light having a long wavelength, the sensor panel may sense an infrared light having entered through the OLED illumination unit.

The OLED illumination unit may correspond to an OLED display panel including at least one OLED to emit a visible light of various colors. When a device to emit the visible light of the various colors is designed to be sufficiently thin to transmit an infrared light having a long wavelength, the sensor panel may sense an infrared light having entered through the OLED illumination unit.

The OLED illumination unit may have a configuration including an invisible light source to emit invisible light used for sensing an object.

The display apparatus may further include a front light unit disposed on an upper part of the OLED illumination unit, the front light unit to emit invisible light used for sensing an object that may touch the OLED illumination unit, or an object that may be proximate to the OLED illumination unit.

The display apparatus may further include an invisible light source, disposed outside of the OLED illumination unit, to emit invisible light used for sensing an object.

The foregoing and/or other aspects are achieved by providing a display apparatus including an organic light emitting diode (OLED) illumination unit comprising at least one OLED to emit visible light for displaying an information image corresponding to an object to be sensed, a sensor panel disposed on a lower part of the OLED illumination unit, the sensor panel to sense at least one of invisible light reflected from the object and a shadow of the object, and a hole, disposed in the OLED illumination unit, to pass the invisible light reflected by the object to the sensor panel for the sensing.

In the display apparatus, the information image corresponds to an input signal generated by the sensing of the object. Further, the input signal corresponds to an image corresponding to a position of the light reflected by the object, the image having an object shape.

In the display apparatus, the OLED illumination unit includes an invisible light source to emit the invisible light.

Additional aspects of embodiments will be set forth in part in the description which follows and, in part, will be apparent from the description, or may be learned by practice of the disclosure.

According to example embodiments, it is possible to easily form a photoconductive layer even when an OLED illumination unit is used, by sensing an invisible light having entered through a hole, the hole to be formed in at least one of the OLED illumination unit and a sensor panel.

According to example embodiments, it is possible to reduce a thickness of a display apparatus when an invisible light is irradiated using an invisible light source included in an OLED illumination unit.

According to example embodiments, a sensor panel may enable sensing an invisible light entering without a hole and an invisible light pass filter, for example, by using an infrared (IR) filter, when an OLED illumination unit having a thin thickness to transmit an invisible light having a long wavelength is provided.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
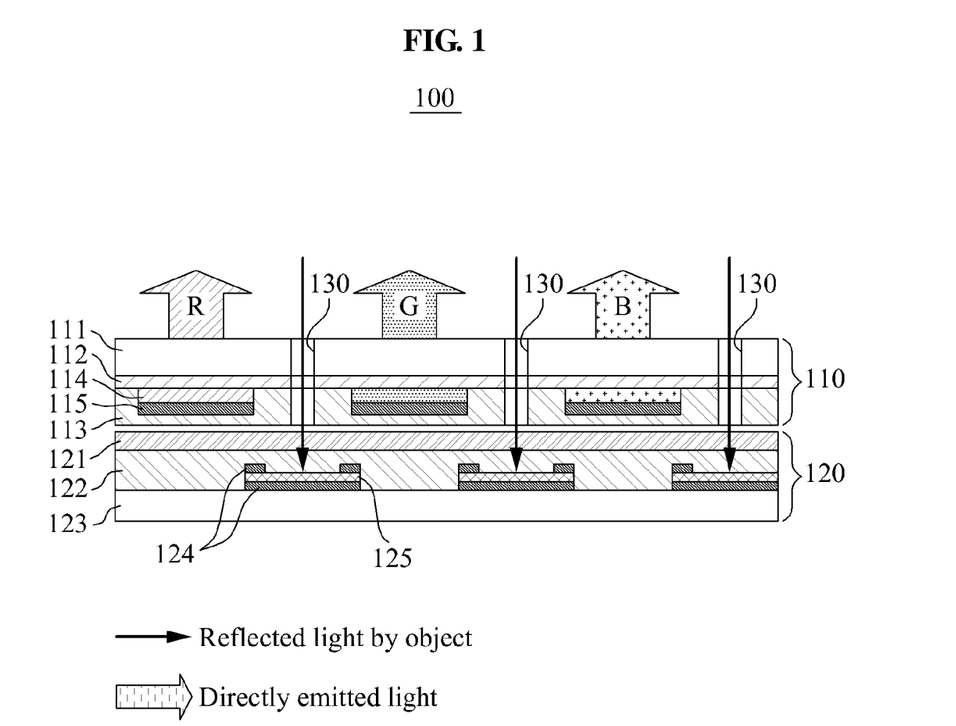
FIG. 1 illustrates a display apparatus that may include a combination of an organic light emitting diode (OLED) illumination unit and a sensor panel according to example embodiments.

FIG. 1 illustrates a display apparatus 100 that may include a combination of an organic light emitting diode (OLED) illumination unit 110 and a sensor panel 120.

According to FIG. 1, the display apparatus 100 may include, for example, the OLED illumination unit 110, the sensor panel 120, and a hole 130. In FIG. 1, the OLED illumination unit 110 may include at least one OLED that may emit a visible light of a same color, and may be configured in a panel form. Also, an OLED display panel including at least one OLED that may emit a visible light of various colors, such as red (R), green (G), blue (B), and the like may be used as the OLED illumination unit 110.

The OLED illumination unit 110 may be disposed on top of the display apparatus 100, and may display an image by receiving an input of image data from an apparatus that may output an information image. The OLED illumination unit 110 may include OLEDs 114 that may emit a visible light used for displaying the information image.

Here, an object, such as a user's finger or a pointing device such as a stylus, may touch an upper part of the OLED illumination unit 110, or may be located in proximity to the upper part of the OLED illumination unit 110. Also, a transparent OLED panel, including the hole 130, may be used as the OLED illumination unit 110.

As an example, when the OLED illumination unit 110 is touched by the object, the OLED illumination unit 110 may display an information image. Here, the information image may correspond to an image corresponding to an input signal generated by a touch of the object.

As another example, when the object is located within a sensing area of the OLED illumination unit 110, the OLED illumination unit 110 may display the information image. That is, when the object is proximate to the OLED illumination unit 110, without touching the OLED illumination unit 110, the OLED illumination unit 110 may display the information image corresponding to the input signal generated by the proximity object. When the object is located within the sensing area of the OLED illumination unit 110, the information image may correspond to an image corresponding to a position of a reflected light that may be reflected by the object and may have an object shape, such as an outline of the object, the object being proximate to the upper part of the OLED illumination unit 110. Here, the input signal generated by the proximity object may correspond to a command to control information that may be displayed on the OLED illumination unit 110. For example, the commands to control the information may include zoom-in, zoom-out, selection, scrolling, turning, sweeping, touchless dragging, and the like.

The OLED illumination unit 110 may have an organic compound disposed between an anode and a cathode. Then, a transparent OLED display panel having a predetermined transparency, for example, 20%, 30%, or 50%, may be manufactured, by manufacturing a device that may emit a light by combining an electron, and a hole in a panel form based on an application of a voltage to the electrodes, and by manufacturing an unused area to be transparent in the manufactured display panel. Here, the OLED illumination unit 110, corresponding to the OLED display panel, may be manufactured in the form of the panel including a glass substrate 111, indium tin oxide (ITO) 112, and an encapsulation layer 113.

The sensor panel 120 may be disposed on a lower part of the OLED illumination unit 110 and may sense at least one of an invisible light reflected by the object and a shadow. Here, the sensor panel 120 may sense at least one of the invisible light and the shadow that may enter through the hole 130 disposed in the OLED illumination unit 110. For example, the invisible light may correspond to an infrared (IR) light, or an ultraviolet (UV) light.

The sensor panel 120 may include, for example, an invisible light pass filter 121, an encapsulation layer, and a glass substrate 123. Here, the invisible light pass filter 121 may pass invisible light by filtering light entering through the hole 130. Then, a photoconductive layer 125 may sense the invisible light passed by the filtering, and the shadow, through the hole 130. Here, the photoconductive layer 125 may be formed on the transparent glass substrate 123. For example, the photoconductive layer 125 may be formed using crystallized silicon, polysilicon, amorphous silicon, or germanium (Ge) having great infrared responsivity.

The hole 130 may be disposed in the OLED illumination unit 110, and may pass the invisible light reflected by the object, and the shadow. With respect to the shadow, for example, the hole 130 may allow sensing, for example by the sensor panel 120, of the shadow created by the object.

As an example, the hole 130 may be formed in the OLED illumination unit 110 and may irradiate invisible light and the shadow to the sensor panel 120. A plurality of holes 130 may also be formed in the OLED illumination unit 110.

Here, the visible light irradiated from the OLED 114, of the OLED illumination unit 110, may be reflected during transmission of the visible light through the glass substrate 111, and may enter the sensor panel 120. Then, the hole 130 may transmit the light reflected by the object, and the shadow using a light interception unit, instead of transferring, to the rear through the hole 130, a scattered light irradiated from the OLED illumination unit 110. Here, the light reflected by the object may include visible light and invisible light. The light interception unit may be disposed on a border between the OLED illumination unit 110 and the sensor panel 120 so that the sensor panel may sense a light vertically entering through the hole 130. Here, a light shield may be used as the light interception unit.

As another example, the hole 130 may be formed in both the OLED illumination unit 110 and the sensor panel 120.

The hole 130 may be formed in the OLED illumination unit 110 through the upper part of the photoconductive layer 125 disposed on the sensor panel 120. The photoconductive layer 125 may sense the invisible light and the shadow that may have entered through the hole 130.

Here, the hole 130 that may connect the OLED illumination unit 110 and the sensor panel 120 may include a plurality of holes. A plurality of holes may be formed in both the OLED illumination unit 110 and the sensor panel 120.

When the OLED illumination unit 110 includes at least one OLED that may emit a visible light of a same color, the hole 130 may be disposed between OLEDs that may emit the visible light of the same color.

When the OLED illumination unit 110 includes at least one OLED that may emit a visible light of various colors, the hole 130 may be disposed between OLEDs that may emit the visible light of various colors.

Figure 2:
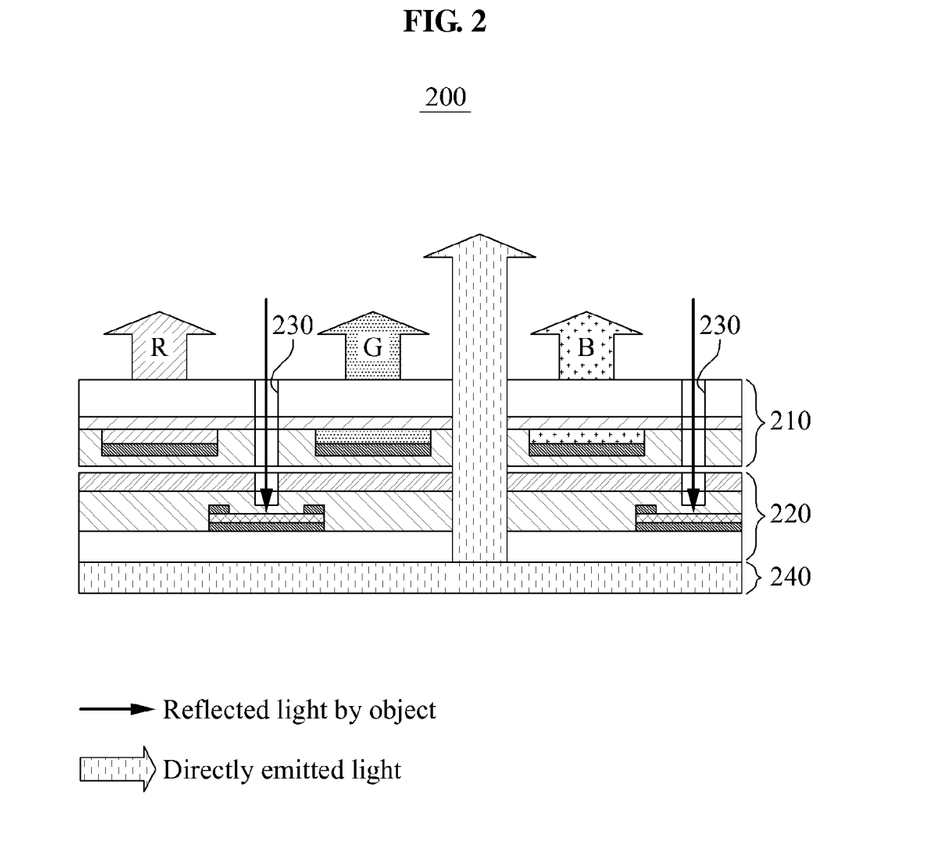
FIG. 2 illustrates a display apparatus that may be combined with a backlight unit according to example embodiments.

FIG. 2 illustrates a display apparatus 200 that may be combined with a backlight unit 240.

FIG. 2 may correspond to a configuration of the display apparatus 100 of FIG. 1, while further including a backlight unit. Thus, a duplicate description of FIG. 1 will be omitted here. In FIG. 2, an OLED illumination unit 210 may include at least one OLED, which may emit visible light of a same color, and may be configured in a panel form. Also, an OLED display panel including at least one OLED that may emit visible light of various colors, such as R, G, B, and the like may be used as the OLED illumination unit 210.

According to FIG. 2, the display apparatus 200 may include, for example, the OLED illumination unit 210, a sensor panel 220, a hole 230, and the backlight unit 240.

The OLED illumination unit 210 may be disposed on a top of the display apparatus 200, and may display an information image, corresponding to an input signal and generated by an object. Here, the OLED illumination unit 210 may include at least one OLED that may emit a visible light used for displaying the information image.

The sensor panel 220 may be disposed on a lower part of the OLED illumination unit 210, and may sense at least one of an invisible light reflected by the object, and a shadow. Here, the sensor panel 220 may sense the invisible light that may have entered through the hole 230 that may connect the sensor panel 220 and the OLED illumination unit 210.

The backlight unit 240 may be disposed on a lower part of the sensor panel and may irradiate the invisible light used for sensing the object.

As an example, the backlight unit 240 may be disposed on a lower part of a glass substrate included in the sensor panel 220. The backlight unit 240 may irradiate the invisible light to the upper part of the OLED illumination unit 210. Then, the sensor panel 220 may sense the invisible light reflected by the object. Accordingly, the sensor panel 220 may sense the invisible light reflected by the object that may touch the OLED illumination unit 210 or the object that may be proximate to the OLED illumination unit 210 even when a separate invisible light source is not disposed outside of the display apparatus 200.

As shown in FIG. 2, when the display apparatus 200 includes the backlight unit 240, the hole 230 may be disposed in both the OLED illumination unit 210 and the sensor panel 220. When the hole 230 is formed in the sensor panel 220 as well, the backlight unit 240 may irradiate the invisible light, used for sensing the object, to the upper part of the OLED illumination unit 210.

Figure 3:
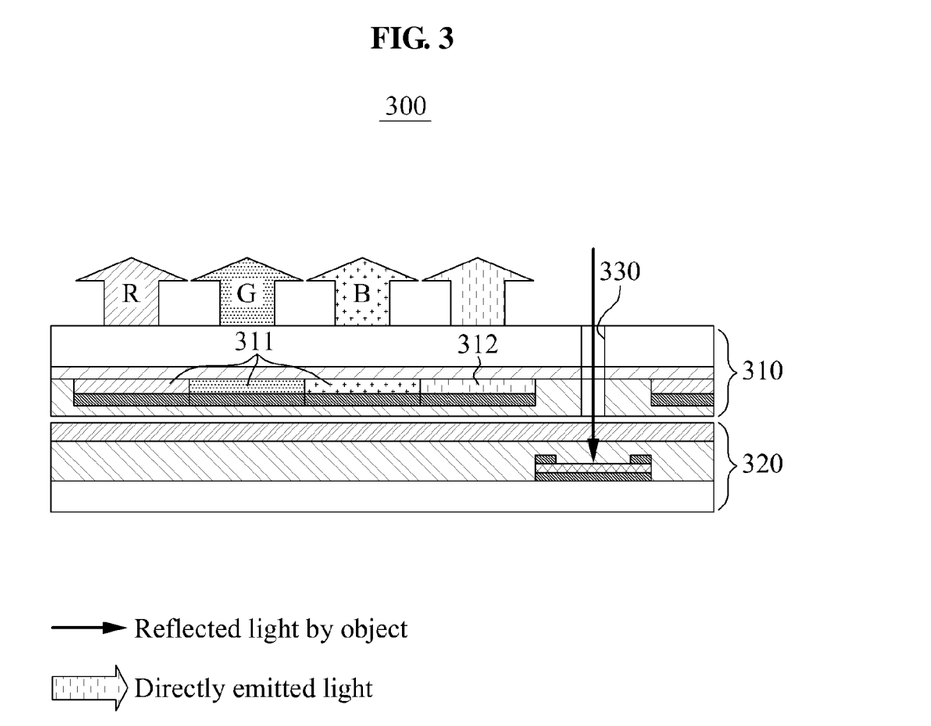
FIG. 3 illustrates a display apparatus having a configuration including an invisible light emitting device in an OLED illumination unit according to example embodiments.

FIG. 3 illustrates a display apparatus 300 having a configuration including an invisible light emitting device in an OLED illumination unit 310.

According to FIG. 3, the display apparatus 300 may include, for example, the OLED illumination unit 310 corresponding to an OLED display panel, a sensor panel 320, and a hole 330. In FIG. 3, since operations of the sensor panel 320 and the hole 330 are similar to the operations of the sensor panel 120 and the hole 130 of FIG. 1, the duplicated description will be omitted here. Meanwhile, the OLED illumination unit 310 of FIG. 3 may correspond to a configuration of the OLED illumination unit 110 of FIG. 1 further including an invisible light emitting device. Accordingly, an operation of the OLED illumination unit 310 will be further described. In FIG. 3, the OLED illumination unit 310 may include at least one OLED that may emit visible light of a same color, and may be configured in a panel form. Also, an OLED display panel including at least one OLED that may emit a visible light of various colors, such as R, G, B, and the like may be used as the OLED illumination unit 310.

The OLED illumination unit 310 may display an information image corresponding to an input signal generated by an object. The OLED illumination unit 310 may have a configuration including an invisible light source that may emit invisible light used for sensing the object.

As an example, the OLED illumination unit 310 corresponding to the OLED display panel may include an OLED 311 and an invisible light emitting device 312. Here, the OLED 311 may emit visible light used for displaying the information image. The invisible light emitting device 312 may emit the invisible light used for sensing the object. The invisible light emitting device 312 may have an irradiation angle different from an irradiation angle of the OLED 311. For example, the OLED light emitting device 311 may be designed to have an irradiation angle close to 180°, for a better viewing angle of the display. Conversely, the invisible light emitting device 312 may be designed to have a narrow irradiation angle, to irradiate the invisible light for a spatially long distance. That is, the irradiation angle of the invisible light emitting device may be designed to be narrow in order to irradiate the invisible light from the OLED illumination unit 310 to the object located at the front.

The hole 330 may be disposed in the OLED illumination unit 310.

As an example, when the hole 330 is disposed in the OLED illumination unit 310, the hole 330 may transmit, to the sensor panel 320, the invisible light reflected by the object, and the shadow by passing the invisible light reflected by the object, and the shadow. Here, the visible light irradiated from the OLED 311, and the invisible light irradiated from the invisible light emitting device 312 may be reflected during transmission of the visible light and the invisible light through a glass substrate, and may enter the sensor panel 320. The hole 330 may transmit only the light reflected by the object, and the shadow using a light interception unit such as a light shield, and the like. That is, when the light interception unit is used, the hole 330 may not transfer, to the rear, through the hole 330, a scattered light irradiated from the OLED illumination unit 310. Here, the light reflected by the object may include a visible light and an invisible light.

As another example, when the hole 330 is disposed in both the OLED illumination unit 310 and the sensor panel 320, the hole 330 may connect the OLED illumination unit 310 and the sensor panel 320, and may transmit the invisible light reflected by the object, and the shadow by passing the invisible light reflected by the object, and the shadow. Here, the visible light irradiated from the OLED 311, and the invisible light irradiated from the invisible light emitting device 312 may be reflected through the glass substrate, and may enter the sensor panel 320. The hole 330 may transmit only the light reflected by the object, and the shadow using the light shield.

Then, the sensor panel 320 may identify a position of the invisible light reflected by the object and having entered through the hole 330, and may sense an image corresponding to the identified position. Accordingly, the sensor panel 320 may sense at least one of the invisible light reflected by the object, and the shadow even when the invisible light source is not disposed outside of the display apparatus.

Here, the display apparatus 300 may further include an operation control unit (not shown) to control operations of the OLED 311 and the invisible light emitting device 312. The operation control unit may control the OLED 311, of the OLED panel 310 to be switched off, and may control the invisible light emitting device 312, to be switched on while the sensor panel 320 performs sensing. The display apparatus 300 may improve sensing of a position of the invisible light, reflected by the object, by controlling the operations of the OLED 311 and the invisible light emitting device 312.

Figure 4:
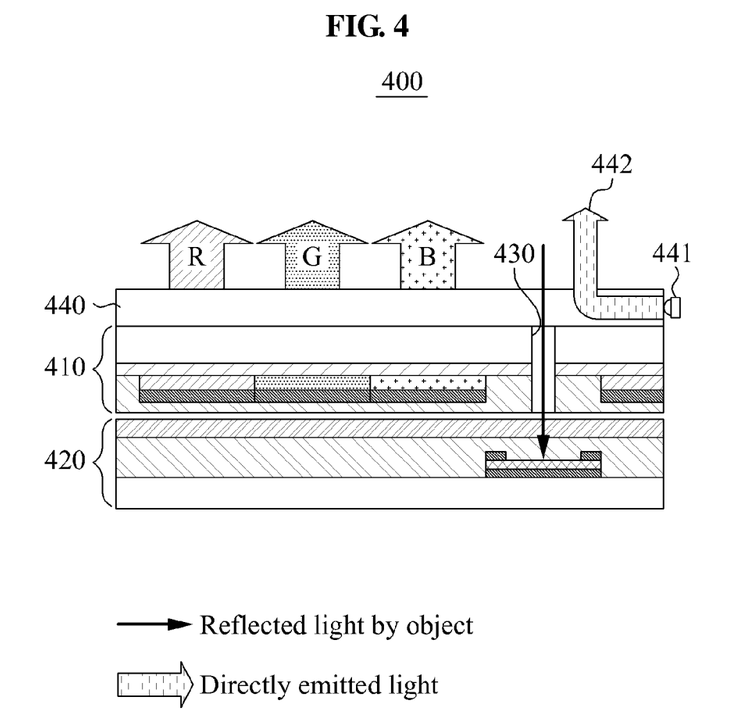
FIG. 4 illustrates a display apparatus that may be combined with a front light unit according to example embodiments.

FIG. 4 illustrates a display apparatus 400 that may be combined with a front light unit 440.

FIG. 4 may correspond to a configuration of the display apparatus 100 of FIG. 1 further including, a front light unit. Thus, a duplicated description compared to the configurations of FIG. 1 will be omitted here.

According to FIG. 4, the display apparatus 400 may include, for example, an OLED illumination unit 410 corresponding to an OLED display panel, a sensor panel 420, a hole 430, and the front light unit 440. In FIG. 4, the OLED illumination unit 410 may include at least one OLED that may emit a visible light of a same color, and may be configured in a panel form. Also, an OLED display panel including at least one OLED that may emit a visible light of various colors, such as R, G, B, and the like may be used as the OLED illumination unit 410.

The OLED illumination unit 410 may display an information image corresponding to an input signal generated by an object. Here, the OLED illumination unit 410 may include an OLED that may emit a visible light used for displaying the information image.

The sensor panel 420 may be disposed on a lower part of the OLED illumination unit 410, and may sense at least one of a visible light reflected by the object, and a shadow. Here, the sensor panel 420 may sense the invisible light that may have entered through the hole 430.

The hole 430 may be disposed in at least one of the sensor panel 420 and the OLED illumination unit 410, and may transmit the invisible light reflected by the object, and the shadow to the sensor panel 420 by passing the invisible light reflected by the object, and the shadow.

As an example, the hole 430 may be disposed in the OLED illumination unit 410, or may be disposed in both the OLED illumination unit 410 and the sensor panel 420. Here, when the hole 430 is disposed in both the OLED illumination unit 410 and the sensor panel 420, the hole 430 may connect the OLED illumination unit 410 and the sensor panel 420.

Also, a light interception unit (not shown) such as a light shield, and the like may be disposed on a border between the hole 430 and the OLED illumination unit 410. Then, the light interception unit may intercept a scattered light, irradiated from the OLED illumination unit 410, so that the scattered light may not be transferred to the rear through the hole 430. The hole 430 may transmit only the light reflected by the object and the shadow to the sensor panel 420. Here, the light reflected by the object may include a visible light reflected by the object and an invisible light reflected by the object.

The front light unit 440 may be disposed on an upper part of the OLED illumination unit 410, and may emit invisible light, used for sensing an image generated by the object. Here, the front light unit 440 may include an invisible light source 441 that may emit invisible light 442 to the object and may be disposed, on an edge, of the front light unit 440.

As an example, when the OLED illumination unit 410 is touched by the object, or the object is proximate to the OLED illumination unit 410, the front light unit 440 may irradiate the invisible light to the object. Then, the sensor panel 420 may sense the invisible light reflected by the object through the hole 430, or may sense the shadow created by the object.

Figure 5:
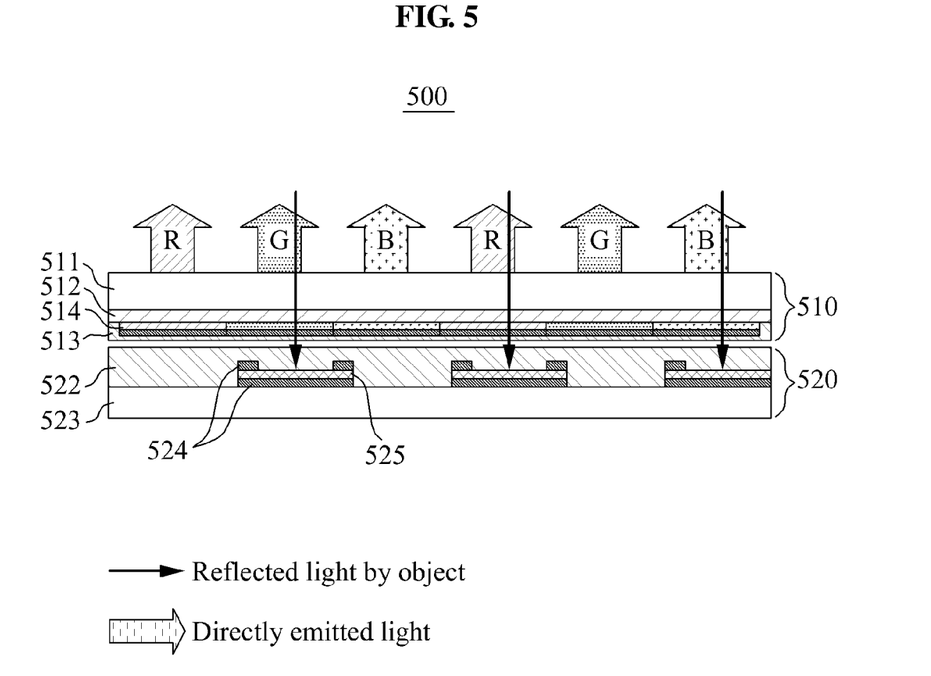
FIG. 5 illustrates a display apparatus that may be combined with an OLED illumination unit that may transmit an invisible light having a long wavelength, and a sensor panel according to example embodiments.

FIG. 5 illustrates a display apparatus 500 that may be combined with an OLED illumination unit 510, which may transmit an invisible light having a long wavelength, and a sensor panel.

FIG. 5 may correspond to the display apparatus 100 of FIG. 1 excluding the hole and the invisible light pass filter. Particularly, the display apparatus of FIG. 5 may correspond to a configuration including an OLED illumination unit that may not transmit a visible light having a short wavelength and may transmit an invisible light having a long wavelength by designing a thickness of the OLED illumination unit to be thin. Accordingly, a duplicated description compared to the configurations of FIG. 1 will be omitted here.

According to FIG. 5, the display apparatus 500 may include, for example, the OLED illumination unit 510, and a sensor panel 520.

The OLED illumination unit 510 may be disposed on a top of the display apparatus 500, and may display an image by receiving an input of image data from an apparatus that may output an information image.

As an example, at least one OLED 514, included in the OLED illumination unit 510, may include an organic compound and a metal plate. A panel may not transmit a visible light having a short wavelength, for example, from about 350 nm to about 780 nm, and may transmit an invisible light having a long wavelength and may be manufactured by reducing the thickness of the OLED to be extremely thin. That is, the OLED illumination may have a thickness thinner than a predetermined standard thickness. Here, the standard thickness may be predetermined to be a thickness that may not transmit the visible light, and may transmit an invisible light having a long wavelength, such as an infrared light. Here, an OLED may be used as a light emitting device.

When the OLED illumination unit 510 is relatively thin, the OLED illumination unit 510 may transmit invisible light, having the long wavelength, without the hole 130 disposed in the OLED illumination unit 110, as shown in FIG. 1. That is, the OLED illumination unit 510 may transmit the invisible light reflected by the object.

The sensor panel 520 disposed on a lower part of the OLED illumination unit 510 may sense the invisible light that may enter from the OLED illumination unit 510. When the OLED illumination unit 510 is combined with the sensor panel 520, the sensor panel 520 may sense the invisible light, having the long wavelength, without the visible light pass filter of FIG. 1. When the OLED illumination unit 510 has the thickness thinner than the predetermined standard thickness, the display apparatus 500 of FIG. 5 may have an effect analogous to an effect of the display apparatus of FIG. 1 without the hole 130 and the invisible light pass filter 121 of FIG. 1.

Figure 6:
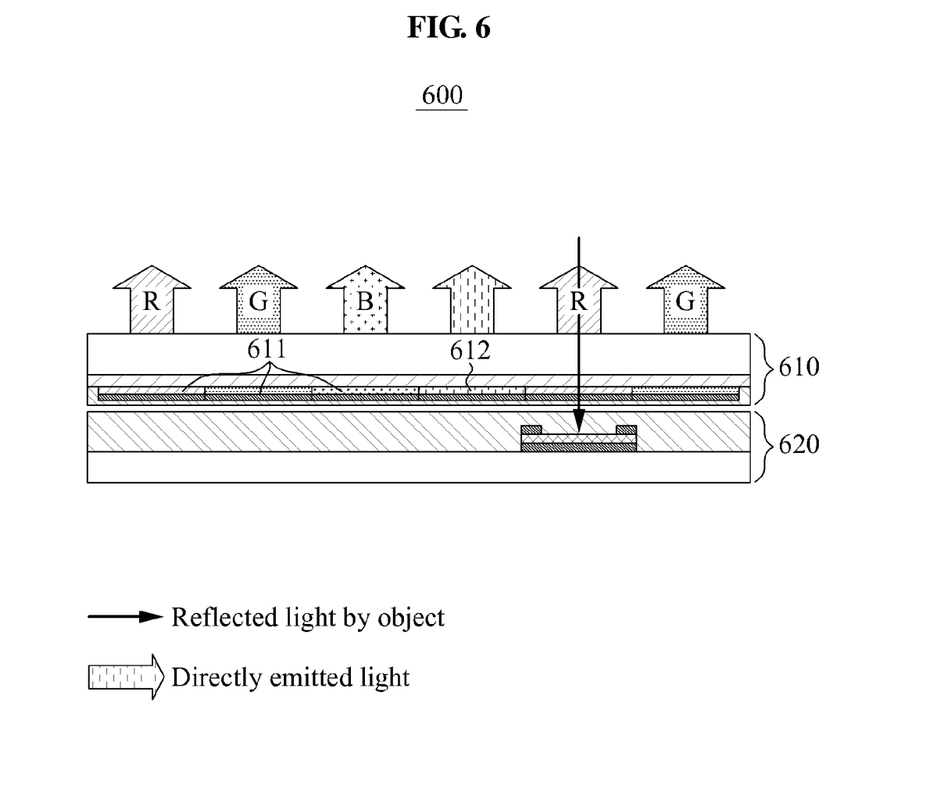
FIG. 6 illustrates a display apparatus having a configuration including an invisible light emitting device in an OLED illumination unit that may transmit an invisible light having a long wavelength according to example embodiments.

FIG. 6 illustrates a display apparatus 600 having a configuration, including an invisible light emitting device, in an OLED illumination unit 610 that may transmit an invisible light having a long wavelength.

FIG. 6 may correspond to the display apparatus 300 of FIG. 3 excluding the hole and the invisible light pass filter. Particularly, the display apparatus 600 of FIG. 6 may correspond to a configuration including an OLED illumination unit that may not transmit a visible light having a short wavelength and may transmit an invisible light having a long wavelength by designing a thickness of the OLED illumination unit to be thin. Accordingly, a duplicated description compared to the configurations of FIG. 3 will be omitted here.

According to FIG. 6, the display apparatus 600 may include, for example, the OLED illumination unit 610, and a sensor panel 620.

The OLED illumination unit 610 may display an information image corresponding to an input signal generated by an object. Here, the OLED illumination unit 610 may have a configuration including an invisible light source that may emit invisible light used for sensing the object.

As an example, the OLED illumination unit 610 corresponding to an OLED display panel may include an OLED 611 and an invisible light emitting device 612. Here, the OLED 611 may emit a visible light used for displaying the information image. The invisible light emitting device 612 may emit an invisible light used for sensing the object. The invisible light emitting device 612 may have an irradiation angle different from an irradiation angle of the OLED 611.

Figure 7:
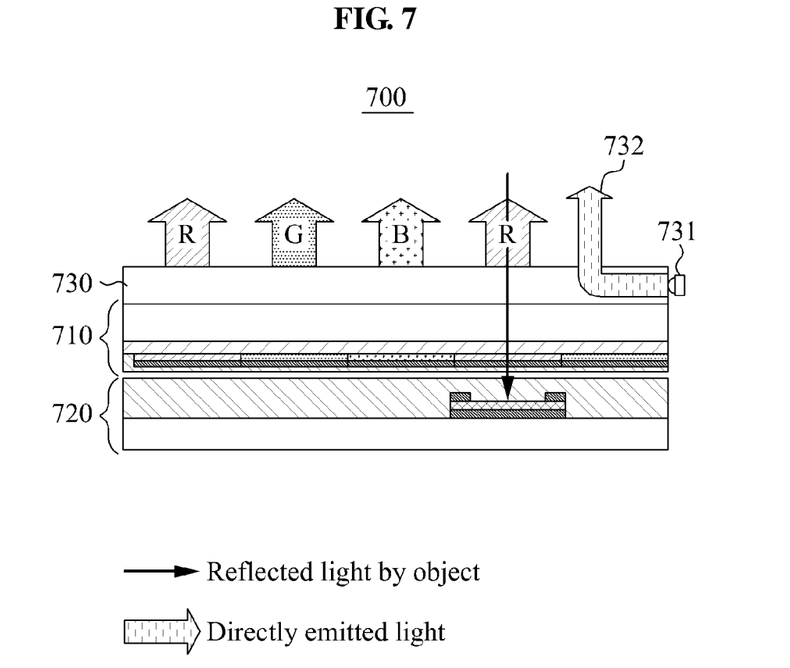
FIG. 7 illustrates a display apparatus that may be combined with a front light unit in an OLED illumination unit that may transmit an invisible light having a long wavelength according to example embodiments.

FIG. 7 illustrates a display apparatus 700 that may be combined with a front light unit 730, in an OLED illumination unit 710 that may transmit an invisible light having a long wavelength.

FIG. 7 may correspond to the display apparatus 400 of FIG. 4 excluding the hole and the invisible light pass filter. Particularly, the display apparatus 700 of FIG. 7 may correspond to a configuration including an OLED illumination unit that may not transmit a visible light having a short wavelength and may transmit an invisible light having a long wavelength by designing a thickness of the OLED illumination unit to be thin. Accordingly, a duplicated description compared to the configurations of FIG. 4 will be omitted here.

According to FIG. 7, the display apparatus 700 may include, for example, the OLED illumination unit 710, a sensor panel 720, and the front light unit 730. In FIG. 7, the OLED illumination unit 710 may include at least one OLED that may emit a visible light of a same color, and may be configured in a panel form. Also, an OLED display panel including at least one OLED that may emit a visible light of various colors, such as R, G, B, and the like may be used as the OLED illumination unit 710.

The OLED illumination unit 710 may display an information image corresponding to an input signal generated by an object. Here, the OLED illumination unit 710 may include an OLED that may emit a visible light used for displaying the information image.

The sensor panel 720 may be disposed on a lower part of the OLED illumination unit 710, and may sense at least one of an invisible light reflected by the object, and a shadow.

The front light unit 730 may be disposed on an upper part of the OLED illumination unit 710, and may emit invisible light used for sensing an image generated by the object. Here, the front light unit 730 may include an invisible light source 731 that may emit invisible light 732 to the object, and the invisible light source 731 may be disposed on an edge of the front light unit 730.

In FIG. 1 through FIG. 7, a configuration that may emit invisible light used for sensing an object proximate to an OLED illumination unit or a touch object, and may display an information image, corresponding to an input signal generated by the object, when an invisible light source is included in the display apparatus has been described. The display apparatus may sense the object when the invisible light source is disposed outside of the display apparatus as well as inside of the display apparatus. The invisible light source disposed outside of the display apparatus may irradiate the invisible light vertically to the OLED display panel or may irradiate the invisible light at a predetermined angle to the OLED illumination unit.

As an example, when a laser pointer corresponding to the invisible light source is disposed outside of the display apparatus, the sensor panel may sense the invisible light that may have entered through the hole at a predetermined angle to the OLED illumination unit. The sensor panel may sense an image pointed to by the laser pointer by obtaining coordinates pointed to by the laser pointer.

As another example, when the laser pointer corresponding to the invisible light source is disposed outside of the display apparatus, the sensor panel may sense the invisible light that may have a long wavelength and may be irradiated at a predetermined angle to the OLED illumination unit having a relatively thin thickness.

In FIG. 1 through FIG. 7, the sensor panel may include at least one invisible light sensor that may sense an invisible light. Here, the invisible light sensor may correspond to a photo diode, and a photo transistor.

The visible light sensor may be disposed in the sensor panel in a matrix form, and may read a voltage or a current that may be changed based on an amount of the invisible light to be irradiated from the invisible light source. Also, the invisible light sensor may provide invisible light intensity of the touch image according to two-dimensional coordinates based on the read voltage or the read current.

In FIG. 1 through FIG. 4, the display apparatus may include at least one hole. That is, the display apparatus that may be combined with a backlight unit or may be combined with a front light unit may include at least one hole. Also, the display apparatus including an OLED illumination unit that may include an invisible light emitting device may include at least one hole. Even when the invisible light source is disposed outside of the display apparatus, the display apparatus may include at least one hole.

A transparent hole may be used as the holes described in FIG. 1 through FIG. 4. The transparent hole may be formed in at least one of the OLED illumination unit and the sensor panel.

Although a few exemplary embodiments have been shown and described, the disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. A display apparatus, comprising:
    an organic light emitting diode (OLED) illumination unit configured to emit light, the OLED illumination unit comprising a plurality of OLEDs disposed in an encapsulation layer, and a substrate disposed over the encapsulation layer;
    a sensor panel disposed on a lower part of the OLED illumination unit and configured to sense at least one of invisible light reflected from an object to be sensed and a shadow of the object;
    a photoconductive layer, disposed on the sensor panel and configured to sense at least one of the invisible light and the shadow; and
    a hole extending through the substrate and the encapsulation layer, and configured to transmit the invisible light to the photoconductive layer disposed on the sensor panel.

2. The display apparatus of claim 1,
    wherein the hole is disposed through an entire depth of the OLED illumination unit to transmit the light to the photoconductive layer below.

3. The display apparatus of claim 2, further comprising:
    a light interception unit disposed on a border between the OLED illumination unit and the hole so that the sensor panel senses light vertically entering through the hole.

4. The display apparatus of claim 1, wherein:
    the OLED illumination unit comprises at least one OLED configured to emit a visible light of a same color, and is configured in a form of a planar panel, and
    the hole is disposed between the at least one OLED.

5. The display apparatus of claim 1, wherein:
    the OLED illumination unit comprises an OLED display panel comprising at least one OLED to emit a visible light of various colors, and
    the hole is disposed between the at least one OLED.

6. The display apparatus of claim 1, wherein the sensor panel senses at least one of the invisible light having entered through the hole disposed in the OLED illumination unit, and the shadow.

7. The display apparatus of claim 1, further comprising:
    a backlight unit disposed on a lower part of the sensor panel and configured to emit invisible light used for sensing an object that touches the OLED illumination unit, or an object that is proximate to the OLED illumination unit,
    wherein, when the backlight unit is disposed on the lower part of the sensor panel, the hole is formed in both the OLED illumination unit and in the sensor panel.

8. The display apparatus of claim 1, wherein the OLED illumination unit comprises an invisible light source configured to emit invisible light used for sensing the object.

9. The display apparatus of claim 1, further comprising:
    a front light unit disposed on an upper part of the OLED illumination unit and configured to emit invisible light used for sensing the object.

10. The display apparatus of claim 9, wherein:
    the front light unit comprises an invisible light source configured to emit invisible light to the object, and
    the invisible light source is disposed on an edge of the front light unit.

11. The display apparatus of claim 1, further comprising:
    an invisible light source disposed outside of the OLED illumination unit and configured source to emit invisible light used for sensing the object.

12. The display apparatus of claim 11, wherein the invisible light source emits the invisible light vertically to the OLED illumination unit, or emits the invisible light at a predetermined angle to the OLED illumination unit.

13. The display apparatus of claim 1, wherein the sensor panel comprises:
    an invisible light pass filter configured to pass the invisible light and the shadow by filtering lights received through the OLED illumination unit.

14. The display apparatus of claim 1, wherein:
    the sensor panel senses invisible light entering through the hole disposed in the OLED illumination unit after the invisible light is reflected from an object to be sensed, and
    the sensor panel detects coordinates of an invisible light source pointed to by the sensing of the invisible light.

15. The display apparatus of claim 1, wherein the sensor panel detects a position of the shadow occurring when the invisible light is covered with the object.

16. The display apparatus of claim 14, wherein the OLED illumination unit displays an information image corresponding to an input signal occurring when the OLED illumination unit is touched by an object, or the object is proximate to the OLED illumination unit.

17. A display apparatus, comprising:
    an organic light emitting diode (OLED) illumination unit comprising a plurality of OLEDs disposed in an encapsulation layer, and a substrate disposed over the encapsulation layer, the OLED illumination unit being configured to transmit an invisible light having a long wavelength while not transmitting a visible light having a short wavelength; and a sensor panel disposed on a lower part of the OLED illumination unit, the sensor panel being configured to sense at least one of the invisible light having the long wavelength and a shadow;

a photoconductive layer, disposed on the sensor panel and configured to sense at least one of the invisible light and the shadow; and a hole extending through the substrate and the encapsulation layer, and configured to transmit the invisible light to the photoconductive layer disposed on the sensor panel.

18. The display apparatus of claim 17, wherein:

the OLED illumination unit comprises at least one OLED configured to emit a visible light of a same color, and is configured in a form of a planar panel, and the sensor panel senses an infrared light having entered through the OLED illumination unit when a device to emit the visible light of the same color is sufficiently thin to transmit an infrared light having a long wavelength.

19. The display apparatus of claim 17, wherein:

the OLED illumination unit corresponds to an OLED display panel comprising at least one OLED to emit a visible light of various colors, and the sensor panel senses an infrared light having entered through the OLED illumination unit when the device to emit the visible light of the various colors is sufficiently thin to transmit an infrared light having a long wavelength.

20. The display apparatus of claim 17, wherein:

the invisible light having the long wavelength corresponds to an invisible light having a wavelength longer than the short wavelength of the visible light, and the OLED illumination unit has a thin thickness to transmit the invisible light having the long wavelength while not transmitting the visible light having the short wavelength.

21. The display apparatus of claim 17, wherein the OLED illumination unit comprises an invisible light source configured to emit invisible light used for sensing an object.

22. The display apparatus of claim 17, further comprising:

a front light unit disposed on an upper part of the OLED illumination unit and configured to emit invisible light used for sensing an object that touches the OLED illumination unit, or an object that is proximate to the OLED illumination unit.

23. The display apparatus of claim 22, wherein:

the front light unit comprises an invisible light source configured to emit invisible light to the object, and the invisible light source is disposed on an edge of the front light unit.

24. The display apparatus of claim 17, further comprising:

an invisible light source disposed outside of the OLED illumination unit and configured to emit invisible light used for sensing an object.

25. The display apparatus of claim 24, wherein the invisible light source emits the invisible light vertically to the OLED illumination unit, or emits the invisible light at a predetermined angle to the OLED illumination unit.

26. A display apparatus, comprising:

an organic light emitting diode (OLED) illumination unit comprising an encapsulation layer, a plurality of OLEDs configured to emit visible light for displaying an information image and disposed in the encapsulation layer, and a substrate disposed over the encapsulation layer;

a sensor panel disposed on a lower part of the OLED illumination unit and configured to sense at least one of invisible light reflected from the object and a shadow of the object; and a hole extending through the substrate and the encapsulation layer, and configured to pass the invisible light reflected by the object to the sensor panel for the sensing, wherein the information image displayed by the OLED illumination unit corresponds to an input signal generated by the sensor panel sensing of the object and comprises a shape of the sensed object.

27. The display apparatus of claim 26, wherein the input signal corresponds to an image corresponding to a position of the light reflected by the object.

28. The display apparatus of claim 26, wherein the OLED illumination unit comprises an invisible light source configured to emit the invisible light.

\* \* \* \* \*